Feb. 25, 1958        J. W. LEFFORGE        2,824,788
PROCESS OF PREPARING BRIGHT YELLOW COLORED PHOSPHORUS SULFIDE
Filed July 23, 1954
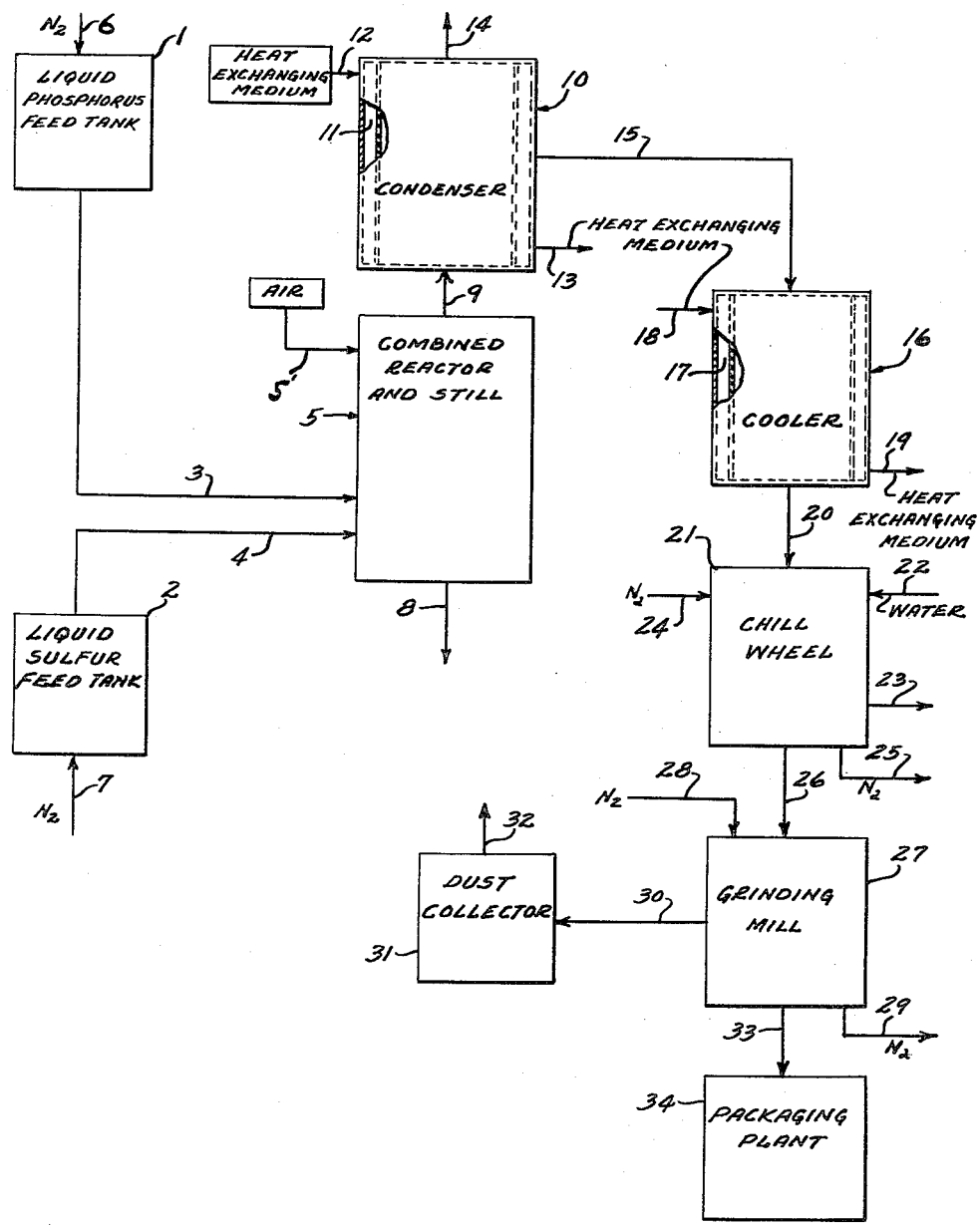
INVENTOR
JOHN W. LEFFORGE
BY    *Elmer P. Rucker*
ATTORNEY

United States Patent Office 2,824,788
Patented Feb. 25, 1958

2,824,788

PROCESS OF PREPARING BRIGHT YELLOW COLORED PHOSPHORUS SULFIDE

John W. Lefforge, Danvers, Mass., assignor to Monsanto Chemical Company, St. Louis, Mo., a corporation of Delaware Application July 23, 1954, Serial No. 445,349

6 Claims. (Cl. 23—206)

This invention relates to phosphorus sulfides and to an improved method of producing same.

Heretofore, phosphorus sulfides have been prepared continuously by introducing phosphorus and sulfur with agitation into a molten heel of phosphorus sulfide and reacting these materials in the proportions calculated to yield the desired product. In carrying out this reaction, the exothermic heat is absorbed by the molten heel of phosphorus sulfide and thereby transferred to a suitable heat exchanging material or surface. The product of this reaction is withdrawn continuously from the reaction zone, flaked on chill rolls and then converted into a powder by grinding in a hammer mill or equivalent pulverizing device. This method provides a means of producing phosphorus sulfides continuously but is subject to certain disadvantages which render the method and product commercially unattractive.

For example, this method invariably yields darkly colored products as a result of the accumulation of impurities including those derived from the raw materials and the metal equipment. The color of these materials can be improved to some extent by distillation, but until the development of the invention disclosed and claimed in the application Serial No. 445,329, filed July 23, 1954, such treatment has involved the use of additional heat and equipment, all of which add substantially to the overall cost of manufacturing these products.

Another disadvantage of this method is that if the phosphorus and sulfur feeds vary from a predetermined rate, the resulting product has a heterogeneous composition due to the presence of excess reactants or the formation of phosphorus sulfides other than the one desired.

In an application assigned to the same assignee as the instant application Serial No. 445,329, filed July 23, 1954, which has issued as Patent No. 2,794,705, June 4, 1957, a method of producing phosphorus sulfides of improved color is disclosed and claimed. In accordance with this method phosphorus and sulfur are introduced continuously into a boiling mass of phosphorus sulfides so as to effect a continuous reaction between the phosphorus and sulfur and continuous distillation of the reaction product. From the standpoint of economy of operation, simplicity of equipment, color improvement of product and product uniformity, this method represents a substantial advance in the art over the method previously described herein. However, it is not possible by this method to produce a phosphorus sulfide such as phosphorus pentasulfide of the desired yellow color for all of its numerous applications since it invariably yields a yellow product with a greyish cast. Thus, while this method yields products having a color which adapt it for many applications, there are certain ones such as the oil additive art in which it is not only desirable but essential that the phosphorus sulfide have a bright canary yellow color. Moreover, such a color is quite desirable from the standpoint of customer appeal and saleability of the product.

Therefore, it is the primary object of the instant invention to provide a method of producing phosphorus sulfides of uniform composition, which overcomes the disadvantages outlined above. More specifically it is an object of the instant invention to provide an economically and commercially feasible method of producing continuously phosphorus sulfides having a bright canary yellow color. Other objects and advantages will become apparent to those skilled in the art as the description of the invention proceeds.

I have developed an economically and commercially feasible method of making phosphorus sulfides having a bright canary yellow color, which represents a substantial advance in the art over the methods described earlier herein. In accordance with the preferred embodiment of this method phosphorus and sulfur are introduced continuously into a heel of boiling phosphorus sulfide contained in a combined reactor and still wherein the exothermic heat of the phosphorus-sulfur reaction effects continuous distillation of the resulting reaction product. Simultaneously with the phosphorus-sulfur reaction, air or oxygen is introduced continuously into the heel of boiling phosphorus sulfide so as to effect improvement in the color of the reaction product.

The distillate obtained as a result of the phosphorus-sulfur reaction is conveyed continuously to a hot condenser where the phosphorus sulfide vapor is condensed substantially completely while the uncondensed gases and phosphorus sulfide vapors are vented to the atmosphere. The condensed liquid phosphorus sulfide is cooled further and fed continuously onto a chill roll which solidifies and breaks up the product into flakes continuously. If desired, the phosphorus sulfide from the combined reactor and still may be cooled in the condenser to a safe operating temperature and fed continuously onto the chill roll. After leaving the chill roll, the flakes are ground continuously into a powder by means of a hammer mill or another equivalent pulverizing device.

As an alternative to this method, the product from the combined reactor and still, without treatment with air or oxygen, is condensed continuously and subjected to combined distillation and treatment with air or oxygen until the product has been converted to the desired bright canary yellow color.

As a further alternative to this method, the phosphorus-sulfur reaction products prepared by the methods of the prior art are subjected to combined distillation and treatment with air or oxygen or to treatment with oxygen or air per se or one of the additives hereinafter mentioned (with or without heating) until the desired bright canary yellow color is obtained.

Stated broadly, the air or oxygen is introduced into the phosphorus sulfide at a rate or in an amount sufficient to yield the desired yellow color. More specifically, the air or oxygen is introduced at a rate or in an amount sufficient to convert about 1% to about 10% and preferably from about 4% to about 8% by weight of the phosphorus sulfide into phosphorus trioxydisulfide.

For a more complete understanding of the improved method of making phosphorus sulfides, reference is made to the accompanying flow sheet which constitutes part of the instant specification.

Reference characters 1 and 2 represent phosphorus and sulfur feed tanks from which these reactants are continuously fed by nitrogen pressure via lines 3 and 4, respectively, into a heel of phosphorus sulfide contained in a combined reactor and still 5, the nitrogen used for this purpose being introduced into tanks 1 and 2 by way of lines 6 and 7, respectively.

The combined reactor and still 5 includes a still pot and in communication therewith a packed column containing porcelain Berl saddles, Pyrex glass rings and wool or equivalent materials. This combined reactor and still is provided with an outlet line 8 for discharging still bottoms therefrom and a discharge line 9 for conveying the distilled phosphorus sulfide vapors from the packed column section (not shown) of the still to a hot condenser 10; it is also equipped with a line 5' for introducing air into the heel of phosphorus sulfide in the combined reactor and still 5.

The condenser 10 is provided with a jacket 11 having an inlet line 12 for introducing a heat exchanging medium at a temperature of about 300° C. and an outlet line 13 for discharging the heat exchanging medium at a temperature of about 305° C. from the jacket. The condenser is also equipped with a vent line 14 for discharging the inert uncondensable gas and traces of phosphorus sulfide from the system, and a take-off line 15 for conducting the condensed liquid phosphorus sulfide to a cooler 16.

The cooler 16 is provided with a jacket 17 having an inlet line 18 for introducing a heat exchanging medium at a temperature of about 300° C. and an outlet line 19 for conducting the heat exchanging medium at a temperature of about 305° C. from the jacket 17. In addition, the cooler 16 is equipped with a discharge line 20 for conveying the cooled phosphorus sulfide into an enclosed chill wheel 21.

The chill wheel 21 is cooled by means of water or another suitable medium introduced by line 22 and discharged therefrom by line 23; in addition, in order to avoid combustion of the phosphorus sulfide being flaked, it is blanketed by means of an inert gas such as nitrogen or carbon dioxide, etc. which is introduced by line 24 into the enclosure therefor (not shown) and discharged therefrom by means of line 25. This chill wheel 19 is provided with an outlet line 26 through which the flaked phosphorus sulfide is conveyed to a grinding mill 27 where the flakes are ground to a finely divided state.

The grinding mill 27 is purged by means of an inert gas such as nitrogen or carbon dioxide, etc. which enters the mill by line 28 and leaves by line 29, the purging being done as a precautionary measure to avoid combustion of the phosphorus sulfide. This grinding mill is provided with a line 30 for conveying fines to a dust collector 31 from which a portion of the inert purging gas is vented into the atmosphere by line 32. The grinding mill 27 is further provided with a line 33 for conveying the final product to the packaging plant 34.

The following are specific examples of the method of carrying out the instant invention employing the system illustrated in the accompanying drawing.

*Example I*

The combined reactor and still 5 was charged with about 150 lbs. of phosphorus pentasulfide and then heated to a temperature of about 515° C. so as to provide a fluid heel or reaction medium for the phosphorus sulfide reaction.

Liquid phosphorus and liquid sulfur, both under nitrogen pressure, were introduced continuously into the above heel of phosphorus pentasulfide at flow rates corresponding to 31 lbs. and 80 lbs., per hour, respectively, said flow rates being sufficient to maintain a reaction temperature of about 515° C. The exothermic heat produced as a result of the reaction between the phosphorus and sulfur caused the resulting phosphorus pentasulfide to distill continuously from the combined reactor and still 5. The distillate including the inert gas was conveyed continuously to the condenser 10 where the phosphorus pentasulfide was cooled to a temperature of about 500° C. and condensed while the inert gas and small amounts of phosphorus pentasulfide vapors were vented by line 14 into the atmosphere. The condensed liquid phosphorus pentasulfide was conducted continuously to the cooler 16 and cooled down to a temperature of about 300° C.–350° C. whereupon it was fed to the chill wheel 21 and converted continuously into flakes. These flakes were conveyed continuously to the grinding mill and converted into a powder at a rate of about 100 lbs. per hour.

The phosphorus pentasulfide thus obtained had a greyish yellow color and a melting point of about 280° C.

*Example II*

The preceding example was repeated but in order to obtain a product of improved color air was introduced continuously at a rate of 26 cubic feet per hour into the heel of phosphorus pentasulfide simultaneously with the phosphorus and sulfur.

The product obtained by this modified method had a bright canary yellow color and a melting point of about 280° C. to about 284° C.

*Example III*

Liquid phosphorus and liquid sulfur were continuously charged under nitrogen pressure into a heel of phosphorus pentasulfide in substantially the proportions required to yield the pentasulfide and a yellowish grey product was collected continuously as a distillate. Then, the feeding of phosphorus and sulfur was discontinued and the distillation continued by the external application of heat. No improvement in color of the product was obtained.

Approximately 1% by weight (basis heel of phosphorus pentasulfide) of boric oxide was added to the heel and the distillation continued for a period of about ¾ hour. The phosphorus pentasulfide product recovered from the operation had a bright canary yellow color, thus demonstrating the effectiveness of boric oxide in improving the color of this product.

In like manner phosphorus heptasulfide and phosphorus sesquisulfide having a bright yellow color can be produced in a continuous manner by continuously feeding air and the reactants in the proportions required to yield these products and by operating at a temperature equivalent to the boiling points of the heptasulfide and sesquisulfide, respectively, at the operating pressure.

In the production of phosphorus pentasulfide in accordance with the instant invention, phosphorus and sulfur are continuously fed to a combined reaction and distillation zone where they are reacted together in a heel of the reaction product and at a temperature at least equivalent to the boiling point of the reaction product at the operating pressure. When operating at atmospheric pressure, the reaction temperature used in the formation of phosphorus pentasulfide should fall substantially in the range of about 505° C. to 525° C., whereas in the production of phosphorus sesquisulfide and phosphorus heptasulfide, the reaction temperature should fall within the ranges of from about 400° C. to about 420° C. and from about 520° C. to about 535° C., respectively.

The reactants are introduced continuously into the heel of phosphorus sulfide at a rate producing a reaction temperature at least equivalent to the boiling point of the phosphorus sulfide, thus insuring continuous distillation of this product substantially as rapidly as it is formed. If desired, the reaction heat may be supplemented by the application of external heating means to the combined reactor and still.

In the production of phosphorus sesquisulfide or phosphorus heptasulfide, the heat of reaction in excess of that required for distillation is dissipated in the condenser by using a distillation rate greater than the production rate and permitting a portion of the condensate to return from the condenser to the reactor still pot and by its cooling action maintain the desired temperature and production rate.

Air is introduced continuously into the heel of the phosphorus sulfide simultaneously with the phosphorus and sulfur at a rate sufficient to produce a product having the desired bright yellow color. In producing a bright yellow phosphorus pentasulfide, air is introduced into the heel of phosphorus pentasulfide with phosphorus and sulfur at a rate sufficient to convert from 1 to 10% and preferably from 4 to 8% by weight of the distilled phosphorus pentasulfide into $P_4S_4O_6$ in accordance with the following equation:

$$P_4S_{10} + 3O_2 \rightarrow P_4S_4O_6 + 3S_2$$

In place of air, additives such as oxygen, free-oxygen-containing gases, phosphorus trioxydisulfide, oxides of boron, phosphorus, sulfur and nitrogen, and materials which under the conditions of phosphorus sulfide distillation form trioxydisulfide may be employed to produce phosphorus sulfides having a bright yellow color.

Somewhat lower feed rates for the additive can be used in the production of a bright yellow colored phosphorus sesquisulfide or phosphorus heptasulfide since these products do not present a color improvement problem that is as serious as is encountered in the manufacture of phosphorus pentasulfide.

Instead of introducing the additive into the heel of phosphorus sulfide, the distilled product may be condensed and then subjected to combined distillation and treatment with the additive or to treatment with the additive per se (with or without heating) to form a light colored product.

The product leaving the combined reaction and distillation zone is cooled to condense the phosphorus sulfide, the temperature used varying with the particular phosphorus sulfide being produced. In the case of phosphorus pentasulfide, the product from the combined reaction and distillation zone is cooled to a temperature of about 500° C. or to a lower temperature above its solidification point to effect substantially complete condensation of the phosphorus pentasulfide.

The condensed phosphorus pentasulfide at a temperature of about 500° C. flows into a cooler where it is cooled to about 300 to 350° C. However, this temperature is not fixed since it varies with the phosphorus sulfide being produced, the only limitation being that the liquid phosphorus sulfide should not be cooled to a temperature preventing free flow thereof onto the chill wheel. This cooling step may be omitted if the product is cooled to a safe operating temperature in the condensation zone.

The liquid phosphorus sulfide is discharged continuously from the condenser or cooler onto a chill wheel and converted into flakes which are introduced continuously into a grinding mill where they are ground to a finely divided state.

The flaking and grinding operations are preferably carried out in the presence of a dry inert atmosphere, but the invention is by no means restricted thereto since this is merely a desirable precautionary measure designed to prevent decomposition of the product by air and moisture.

The products of the instant invention are suitable for use in organic synthesis and in a number of commercial applications such as anticorrosive agents and antioxidants for oils, in the manufacture of extreme pressure and lubricants, match compositions and vulcanized rubber.

What I claim is:

1. The method of preparing bright yellow colored phosphorus sulfides which comprises introducing free oxygen-containing gas into a mass of darkly colored phosphorus sulfide while subjecting the resulting product to distillation to separate said phosphorus sulfide in the form of a product having a bright canary yellow color, said free oxygen-containing gas being employed in an amount sufficient to produce said color improvement.

2. The method of preparing bright yellow colored phosphorus pentasulfide which comprises introducing free oxygen-containing gas into a mass of darkly colored phosphorus pentasulfide while subjecting the resulting product to distillation to separate said phosphorus pentasulfide in the form of a product having a bright canary yellow color, said reagent being employed in an amount sufficient to produce said color improvement.

3. The method of preparing bright yellow colored phosphorus pentasulfide which comprises introducing free oxygen-containing gas into a mass of darkly colored phosphorous pentasulfide while subjecting the resulting product to distillation to separate said phosphorus pentasulfide in the form of a product having a bright canary yellow color, said free oxygen-containing gas being employed in an amount sufficient to convert about 1% to about 10% of said phosphorus pentasulfide into phosphorus trioxydisulfide.

4. The method of preparing bright yellow colored phosphorous sulfides which comprises continuously introducing phosphorus, sulfur and free oxygen-containing gas into a boiling mass consisting of a darkly colored phosphorus sulfide, and thereby effecting a continuous reaction between said phosphorus and said sulfur and continuous distillation of said reaction product in the form of a bright canary yellow colored product, said reactants being introduced continuously into said boiling mass in substantially proportions calculated to yield said phosphorus sulfide and at a rate maintaining said mass in a boiling condition, and said free oxygen-containing gas being introduced at a rate sufficient to convert about 1% to about 10% of said distilled reaction product into phosphorus trioxydisulfide.

5. The method of preparing bright yellow colored phosphorus sulfides which comprises continuously introducing phosphorus, sulfur and free oxygen-containing gas into a boiling mass consisting of a darkly colored phosphorus sulfide, and thereby effecting a continuous reaction between said phosphorus and said sulfur and continuous distillation of said reaction product in the form of a bright canary yellow colored product, said reactants being introduced continuously into said boiling mass in substantially the proportions calculated to yield said phosphorus sulfide and at a rate maintaining said mass in a boiling condition, and said free oxygen-containig gas being introduced at a rate sufficient to convert about 4% to about 8% of said distilled reaction product into phosphorus trioxydisulfide.

6. The method of preparing bright yellow colored phosphorus pentasulfide which comprises continuously introducing phosphorus, sulfur, and free oxygen-containing gas into a boiling mass consisting of darkly colored phosphorus pentasulfide, and thereby effecting a continuous reaction between said phosphorus and said sulfur and continuous distillation of said reaction product in the form of a bright canary yellow colored product, said reactants being introduced continuously into said boiling mass in substantially the proportions calculated to yield said phosphorus pentasulfide and at a rate maintaining the said mass in a boiling condition, and said free oxygen-containing gas being introduced at a rate sufficient to convert about 4% to about 8% of said distilled reaction product into phosphorus trioxydisulfide.

References Cited in the file of this patent

UNITED STATES PATENTS 2,569,128    Jones _____ Sept. 25, 1951

FOREIGN PATENTS 420,832    France _____ Dec. 5, 1910